United States Patent [19]
Yoshikawa et al.

[11] Patent Number: 6,129,849
[45] Date of Patent: Oct. 10, 2000

[54] PROCESS FOR ACCELERATING REACTION OF OZONE WITH AM CATALYST

[75] Inventors: Motonobu Yoshikawa; Akira Murai; Ikuo Kouno; Kazuhiro Miura, all of Osaka, Japan

[73] Assignees: Kansai Electric Power Co., Inc.; Kansai Environmental Engineering Center Co., Ltd., both of Osaka, Japan

[21] Appl. No.: 09/195,984

[22] Filed: Nov. 19, 1998

[30] Foreign Application Priority Data

Oct. 23, 1998 [JP] Japan .................................. 10-302069
Oct. 23, 1998 [JP] Japan .................................. 10-302070
Oct. 23, 1998 [JP] Japan .................................. 10-302071
Oct. 23, 1998 [JP] Japan .................................. 10-302072

[51] Int. Cl.$^7$ ........................................................ C02F 1/78
[52] U.S. Cl. ...................... 210/760; 210/763; 210/916; 210/917
[58] Field of Search .................................. 210/758, 760, 210/763, 909, 916, 917

[56] References Cited

U.S. PATENT DOCUMENTS 5,849,201 12/1998 Bradley .................................... 210/752

FOREIGN PATENT DOCUMENTS 52-8650   1/1977  Japan .
3-143594  6/1991  Japan .
6-23377   2/1994  Japan .
8-229580  9/1996  Japan .
10-113659 5/1998  Japan .

*Primary Examiner*—David A. Simmons
*Assistant Examiner*—Betsey Morrison Hoey
*Attorney, Agent, or Firm*—Sterne, Kessler, Goldstein & Fox P.L.L.C.

[57] ABSTRACT

In treatment of water by injection of ozone into the water for removal of harmful matters, odor matters, and color matters therein, either or both of a nonyl phenol and a cresol are added to the water to be treated. The nonyl phenol is added together with a lower alcohol or acetone to the water to be treated. The cresol is added together with a lower alcohol or acetone to the water to be treated. A p-nonyl phenol is added as the nonyl phenol for treatment. As the cresol for addition, a p-cresol is added. As the nonyl phenol for addition, a nonyl phenol is used such that two molecular weights of 220 and 107 are detected when measured by either or both of gas chromatography and mass spectrometry. By the above treatment, the decomposition reaction of ozone can be accelerated, and thereby it becomes possible to accelerate the oxidative decomposition reaction of organic matters, the amount of ozone required for the decomposition of harmful matters can be reduced with the decomposition time. The decomposition rate of organic matters can be accelerated by addition of a nonyl phenol or a cresol. Accordingly, when the process for accelerating the reaction of ozone is applied in water treatment, the treatment rate of water can be enhanced. The treatment volume per time of water can be enhanced, whereby the site area for water treatment facilities can be reduced even in the event that the capacity of a reaction tank is reduced.

7 Claims, 3 Drawing Sheets

FIG. 4

| Sumple | Concentration of Phenol Type Substantive (μg/L) | |
|---|---|---|
| | Before Treatment by Ozone | After Treatment by Ozone |
| I | 0.1 | Up To 0.1 |
| N | 5.1 | Up To 0.1 |
| Pure Water | Up To 0.1 | Up To 0.1 |

PROCESS FOR ACCELERATING REACTION OF OZONE WITH AM CATALYST

TECHNICAL FIELD

The present invention relates to a technique for enhancing the reaction rate of ozone in treatment of water by injection of ozone into the water for removal of harmful matters, odor matters, and color matters therein.

BACKGROUND ART

In recent years, people have much been concerned about the environment. Particularly, water which has an intimate relation to their living has been a matter of primary concern.

Harmful matters such as organic matters, ammonia, and so forth, and matters which may cause odors and colors are contained in secondary sewage treatment water, secondary night soil treatment water, industrial waste water, tap water, small water supply system water, exclusive tap water, water for industrial use, wastewater recycling system water, and effluents from fish farms and culture ponds.

Accordingly, it is necessary to treat water highly. Various water treatment methods have been investigated. Especially, contamination of rivers with phenol type organic matters is a great concern. Anxiety has been directed to nonyl phenols or nonyl phenol isomers regarded as estrogen which causes troubles as environmental hormone.

The nonyl phenol isomers are produced while chemical substances contained in surfactants and so forth are decomposed in rivers. The phenol type organic matters have a benzene ring and can not easily be decomposed by heating and so forth. By addition of chlorine, the decomposition becomes possible. However, when the phenol type organic matters are decomposed with chlorine added, undesired chlorides are formed.

As to such treatment of water as described above, a water treatment method using ozone is well known. For removal of harmful matters, odor matters, and color matters by oxidative decomposition, and for pasteurization, this method is widely used.

For the purpose of enhancing the oxidation decomposition rate of harmful matters in water with ozone, that is, the treatment rate of the water, there is known a method for adding a surfactant whereby the contact between foul water and ozone is increased, as stated in Japanese Unexamined Patent Publication No. 52-8650.

As generally known, the oxidative reaction of ozone in water is due to the direct-contact reaction of an ozone molecule, and the hydroxyl radical (OH.) and the hydroperoxy radical ($HO_2$.) produced by the self-decomposition of ozone. Particularly, the hydroperoxy radical (HO.) has a higher oxidation capacity. The increase of hydroperoxy radicals increase the efficiency of the reaction.

The following methods for accelerating the above reaction are well known: the pH value of water to be treated is enhanced; hydrogen peroxides are added; ultraviolet rays are irradiated; radiation is applied; supersonic waves are applied; catalysts such as metal ions, metal oxides, and so forth are used; and so forth.

In addition, there is a well-known method for treating foul water with ozone in the presence of a phenol, benzoic acid, and dodecyl benzensulfonic acid as a catalyst. For example, such a method is stated in Japanese Unexamined Patent Publication No. 06-23377.

However, in the above-described techniques, ozone is relatively expensive, and the oxidative decomposition rate of ozone is low. Accordingly, water treatment at a high efficiency is realized with difficulty only by introducing water under treatment into a large-scale reaction tank, and injecting ozone.

According to the method of adding a surfactant, as stated in Japanese Unexamined Patent Publication No. 52-8650, the reaction is accelerated by increasing the area of reaction sites. When lots of organic matters exist in water under treatment, the surfactant may be absorbed by the organic matters in the water, so that the frothing capacity is reduced. If the amount of the surfactant is increased in order to compensate for the reduced frothing capacity, lots of foam will be generated, which probably causes troubles in working.

According to the method for treating foul water with ozone in the presence of a phenol, benzoic acid, or dodecy benzenesulfonic acid, as stated in Japanese Unexamined Patent Publication No. 06-23377, it is difficult to treat foul water with ozone sufficiently efficiently in the presence of the catalyst.

DISCLOSURE OF INVENTION

According to the present invention, in a process for removing harmful matters, especially environmental hormone in water by injection of ozone into the water, either or both of a nonyl phenol and a cresol are added to the water to be treated.

In the same process, the nonyl phenol is added together with a lower alcohol or acetone to the water to be treated.

In the same process, the cresol is added together with a lower alcohol or acetone to the water to be treated.

As the nonyl phenol for addition, a p-nonyl phenol is added.

As the cresol for addition, p-cresol is added.

As the nonyl phenol for addition, nonyl phenol is used such that two molecular weights of 220 and 107 are detected when measured by either or both of gas chromatography and mass spectrometry.

BRIEF DESCRIPTION OF DRAWINGS

FIG. 4 is a table showing experimental results of EXAMPLE 1.

BEST MODE FOR CARRYING OUT THE INVENTION

According to the present invention, the amount of a catalyst for addition containing a nonyl phenol or cresol as a major component is about 0.1 ppm by weight percent, though the optimum amount depends on the state of water to be treated.

The nonyl phenol used for the catalyst according to the present invention is decomposed during the treatment. It is supposed to become a phenol to which an alkyl group with a carbon number of nearly 9 or not more than 9 is bonded.

The nonyl phenol as the catalyst may be an o-, a m-, or a p-nonyl phenol. The p-nonyl phenol is most preferable, and was evidenced that it has a high effect on acceleration of the decomposition of organic matters with ozone.

The cresol as the catalyst may also be an o-, a m-, or a p-cresol. Of the three types of cresols, the p-cresol, which had the greatest effect on acceleration of the decomposition of organic matters with ozone in the hereinafter EXAMPLE 2, is most preferable.

Also, in a process according to the present invention, a lower alcohol or acetone is added together with the nonyl phenol or the cresol as the catalyst to water to be treated, so that the nonyl phenol or the cresol can be dissolved in the water. In EXAMPLES 1 to be discussed later, methanol of a lower alcohol was used. In EXAMPLE 2 to be discussed later, acetone was used. The addition manner of the nonyl phenol or the cresol is not limited to the above-described manner. Any manner will do, if it makes the nonyl phenol or the cresol soluble in water to be treated. Other solvents or surfactants may be used.

Moreover, by addition of a surfactant to water to be treated, ozone injected into the water may be held on bubbles, so that the contact areas between the water and the ozone can be increased. Accordingly, the reaction rate can be enhanced.

Though the mechanism with respect to how the nonyl phenol present acts to a reaction system of ozone, according to the present invention, has not been revealed, it is suggested that the nonyl phenol accelerates the production of the hydroxyl radical having a higher oxidative capacity than the ozone, thereby accelerating the oxidative decomposition of organic matters in water to be treated.

Figure 1:
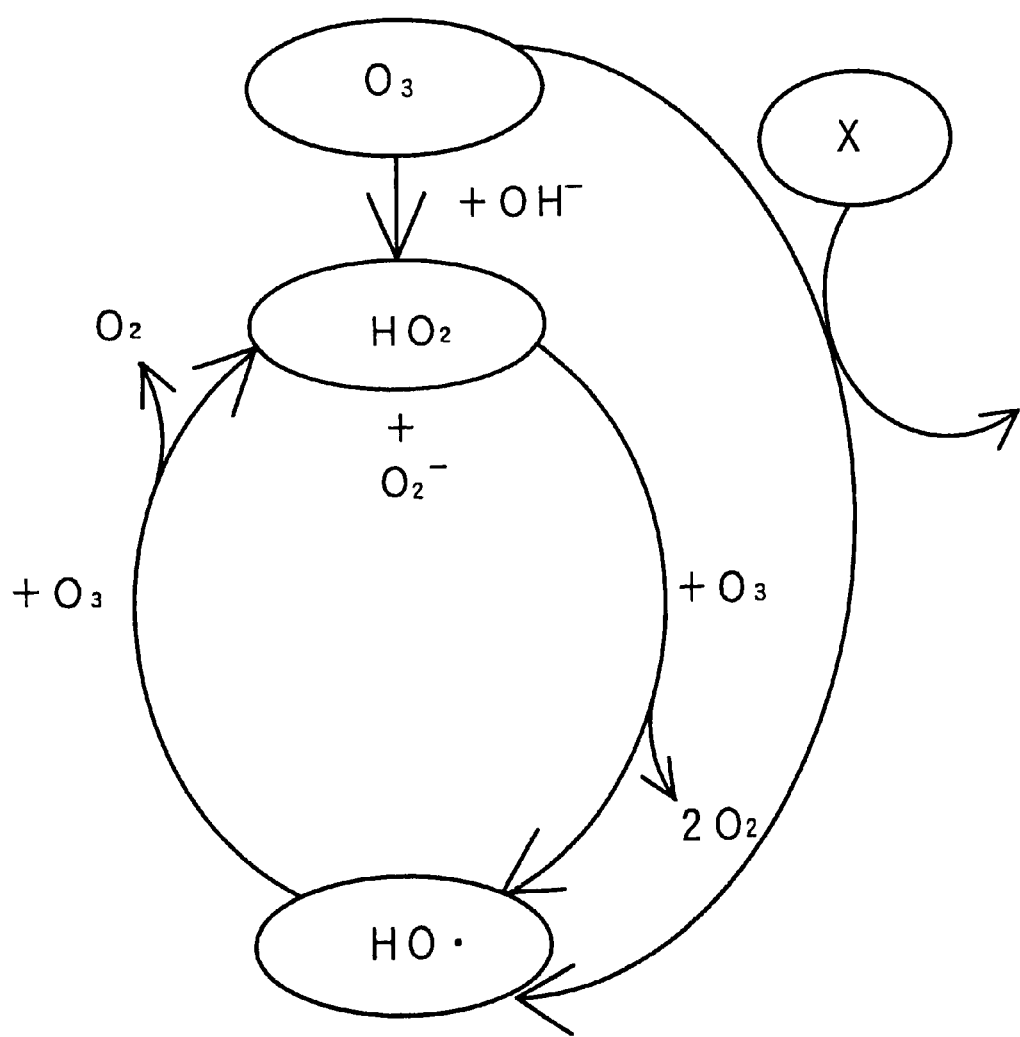
FIG. 1 is a scheme illustrating the radical generation reaction of ozone.

In this regard, in the self-decomposition reaction of ozone in water, as illustrated in FIG. 1, an ozone molecule reacts with a hydroxide ion so as to produce the hydrogen superoxide or the superoxide ion. Further, the produced hydrogen superoxide reacts with an ozone molecule so as to produce the oxygen and the hydroxyl radical. The hydroxyl radical produced as such oxidatively decomposes the organic matters in water to be treated, however, the amount thereof is not so much as to decompose the organic matters sufficiently.

On the other hand, when a substance X, which is capable of accelerating the self-decomposition of ozone, exists in water, the hydroxyl radical is further produced from the ozone molecule by its contact with the substance X, as shown in FIG. 1, in addition to that produced as described above, whereby the produced hydroxyl radical is increased so as to accelerate the decomposition of organic matters in the water to be treated. It is suggested that the nonyl phenol as the catalyst according to the present invention holds for the substance X capable of accelerating the self-decomposition of ozone, that is, a reduction catalyst for ozone, or to be detailed, the compounds produced in the process of decomposition of the nonyl phenol with ozone accelerate the self-decomposition of ozone and the oxidative decomposition of organic matters.

Figure 2:
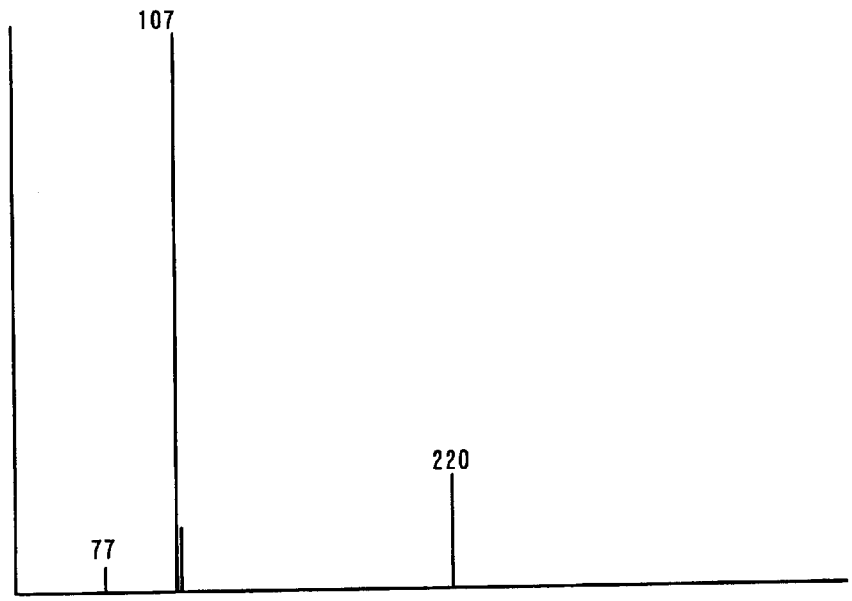
FIG. 2 is a mass spectrum of a nonyl phenol for a catalyst according to the present invention.

The nonyl phenol, which is used for the catalyst according to the present invention, was analyzed by gas chromatography and mass spectrometry, exhibiting two distinct peaks at molecular weights of 220, 107 as shown in FIG. 2. This suggests that the nonyl phenol has a high purity without other substances contained, and has characteristics exhibited by the gas chromatography and the mass spectrometry.

Regarding this, when other generally-used nonyl phenols are added to water to be treated by injection of ozone, the acceleration of reaction of ozone does not appear. The generally-used nonyl phenols were analyzed by gas chromatography and mass spectrometry. As a result, plural peaks were shown. This evidenced that with the other generally-used nonyl phenols, other isomers are mixed.

Accordingly, it is understood that using a nonyl phenol such that two molecular weights of 220 and 107 are detected when measured by either or both of gas chromatography and mass spectrometry is most preferable for a catalyst accelerating the reaction of ozone. The catalyst containing a nonyl phenol or cresol as a major component is called an AM catalyst.

Hereinafter, examples of the present invention will be now described. However, it should be understood that the present invention is not limited to the examples.

EXAMPLE 1

River water samples I, N were collected. The concentrations of nonyl phenol isomers as a phenol type substance in the river water samples I, N and pure water were measured. Then, the collected river water samples I, N and the pure water were placed into containers in an amount of 500 ml, respectively. A standard reagent (containing the above-mentioned nonyl phenol which appears two peaks of molecular weights of 220 and 107 when measured by either or both of gas chromatography and mass spectrometry, and methanol) in accordance with the present invention was added, and then ozone was injected. The standard reagent was added in an amount of 100 $\mu$g based on 1 liter of water. Then, the amounts of phenol type substances contained in the samples of collected river water and pure water were measured. The above treatment was carried out at room temperature.

The concentration of phenol type substances contained in the river water sample I was 0.1 ($\mu$g/l). That in the river water sample N was 5.1 ($\mu$g/l), and that in the pure water was up to 0.1 ($\mu$g/l).

For the river water sample 1, the injection amount of ozone was 8.5 g, the injection time was 40 minutes, the injection amount of the gas was 1 Nl/min, and the absorption amount of ozone was 3.9 g.

For the river water sample N, the injection amount of ozone was 6.3 g, the injection time was 30 minutes, the injection gas amount was 1 Nl/min, and the absorption amount of ozone was 3.3 g.

For the pure water sample, the injection amount of ozone was 6.0 g, the injection time was 30 minutes, the injection amount of gas was 1 Nl/min, and the absorption amount of ozone was 3.0 g.

After the standard reagent was added and ozone was injected, the amounts of the phenol type substance in the river water samples I, N, and the pure water were measured, respectively. As seen in FIG. 4, all of the measurements of the phenol type substances in the river water samples I, N and the pure water sample were up to 0.1 ($\mu$g/l).

As seen in EXAMPLE 1, the concentration of nonyl phenols or nonyl phenol isomers could be reduced, which are phenol type substances contained in the samples (especially, the samples I and N) and regarded as environmental hormone causing troubles.

Moreover, the result that the detected concentration of the phenol type substances in the pure water, to which the standard reagent containing the above-mentioned nonyl phenol was added, treated with ozone was 0.1 $\mu$g/l reveals that the added nonyl phenol itself is also oxidative-decomposed with the hydroxyl radicals and the oxygen radicals produced in the presence of the nonyl phenol. In other words, the addition of the nonyl phenol as the catalyst of the present invention accelerates the decomposition reaction of ozone and does not disturb the oxidative-decomposition reaction of matters caused by the ozone or the hydroxyl radicals.

EXAMPLE II

To 300 ml of super pure water, 100 ml of tap water was added, and an aqueous red ink containing a surfactant was dropped. The resultant solution was placed into a 500 ml beaker 1 to prepare solution A. Air was jetted into the prepared solution A. In this case, no frothing was caused.

Figure 3:
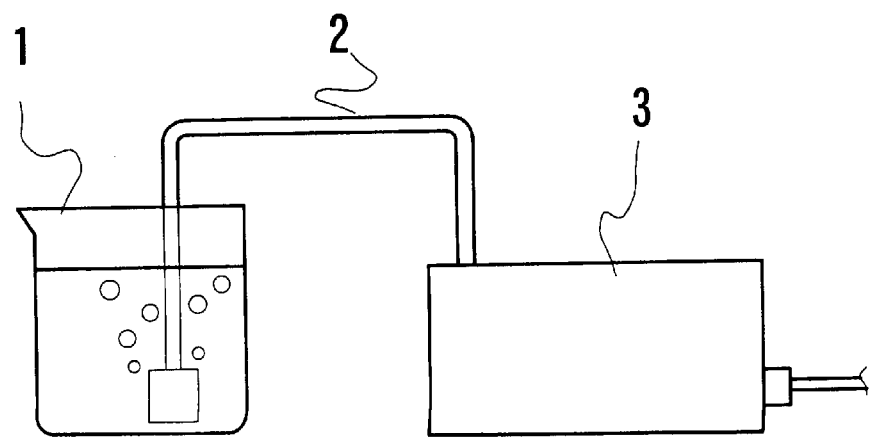
FIG. 3 is a scheme showing an experimental apparatus which is employed in the process of the present invention.

After that, as shown in FIG. 3, ozone was injected into the beaker 1 containing the solution A through a pipe 2 with an ozone generator 3. As a result, when ozone was injected, a frothing phenomenon occurred in the solution A. The frothing phenomenon continued for only about 5 minutes.

Then, to the solution A, one drop (about 0.03 ml) of a solution of a nonyl phenol dissolved in acetone in such an amount as to give a concentration of 10 $\mu$g/l was added. After that, ozone was injected into the beaker 1 containing the solution A, to which the solution prepared by dissolving nonyl phenol in acetone was added, through a pipe 2 with the ozone generator 3. As a result, a frothing phenomenon continued for 10 minutes or longer.

Alternatively, to the solution A, one drop (about 0.03 ml) of acetone was added, and ozone was injected as described above. As a result, a frothing phenomenon occurred, however, the froth disappeared 5 minutes after.

Alternatively, to the solution A, one drop (about 0.03 ml) of reagents prepared by dissolving each of o-cresol, m-cresol, and p-cresol in such an amount as to give a concentration of 10 $\mu$g/l, in acetone was added, and ozone was injected as described above.

With regard to the solution A to which o-cresol was added, a frothing phenomenon continued.

With regard to the solution A to which m-cresol was added, a frothing phenomenon continued.

With regard to the solution A to which p-cresol was added, a frothing phenomenon continued, and a vigorously frothing phenomenon was observed.

For the decomposition effect of the red ink serving as coloring matter and the surfactant, the presence of residual chlorine (Cl) in tap water is required. In case that ozone is injected into water without chlorine, white color bubbles will be generated. The solution A included residual chlorine (Cl) which had existed in the tap water, so that red bubbles colored by the red ink were generated when ozone was injected thereto. Under just injection of ozone, the red bubbles disappeared soon as the above described. In the case that ozone was injected into the solution A after the nonyl phenol or the cresol was added thereto, the frothing phenomenon continued as the above described, wherein first red bubbles were generated, and thereafter, the bubbles became white. From these facts, it is proposed that the nonyl phenol and the cresol accelerate the decomposition of interacting coloring matters and surfactants contained in the solution A with ozone.

INDUSTRIAL APPLICABILITY

As described above, according to the process of the present invention, the addition of a nonyl phenol accelerates the decomposition reaction of ozone, whereby it becomes possible to accelerate the oxidative decomposition reaction of organic matters by ozone. Accordingly, the amount of ozone can be reduced with the decomposition time, which is required to decompose nonyl phenols or nonyl phenol isomers which are harmful phenol type substances regarded as estrogen in treatment of effluents or sewage water for prevention of environmental contamination. Also, the cost can be reduced which is needed for decomposition of harmful matters, especially, nonyl phenols or nonyl phenol isomers which are harmful phenol type substances regarded as estrogen, so that the harmful matters are converted to be non-harmful.

By adding a nonyl phenol or a cresol to water containing phenol type organic matters therein and injecting ozone thereto, there is a high possibility that not only the organic matters but also the added nonyl phenol or cresol are decomposed and removed.

In addition, since the decomposition rate of the organic matters by ozone can be accelerated by addition of a nonyl phenol or a cresol according to the above-described method, the water treatment using ozone, when employing such process for accelerating the reaction of ozone, can be improved in its treatment rate of water, so that the treatment volume per time of water to be treated can be enhanced, whereby the site area for treatment facilities can be reduced even in the event that the capacity of a reaction vessel is reduced. Moreover, by this treatment, the removal ratios of the phenol type substances, and nonyl phenols or nonyl phenol isomers regarded as environmental hormone causing troubles can be enhanced.

What is claimed is:

1. A process for accelerating the reaction of ozone in treatment of water by injection of ozone into the water for removal of harmful matters, odor matters, and color matters, comprising the step of adding a nonyl phenol to the water to be treated, wherein two molecular weights of 220 and 107 are detected when said nonyl phenol is measured by either gas chromatography and mass spectrometry or both.

2. A process for accelerating the reaction of ozone according to claim 1, wherein said nonyl phenol for addition is used as a reduction catalyst for the ozone.

3. A process for accelerating the reaction of ozone according to claim 1, wherein said nonyl phenol is a p-nonyl phenol.

4. A process for accelerating the reaction of ozone in treatment of water by injection of ozone into the water for removal of harmful matters, odor matters, and color matters, comprising the step of adding a nonyl phenol, and a lower alcohol or acetone to the water to be treated, wherein two molecular weights of 220 and 107 are detected when said nonyl phenol is measured by either gas chromatography and mass spectrometery or both.

5. A process for accelerating the reaction of ozone in treatment of water by injection of ozone into the water for removal of harmful matters, odor matters, and color matters, comprising the step of adding a cresol to the water to be treated.

6. A process for accelerating the reaction of ozone according to claim 5, wherein said cresol is a p-cresol.

7. A process for accelerating the reaction of ozone in treatment of water by injection of ozone into the water for removal of harmful matters, odor matters, and color matters, comprising the step of adding a cresol, and a lower alcohol or acetone to the water to be treated.

* * * * *